United States Patent [19]

Fregeolle

[11] E Re. 29,034

[45] Reissued Nov. 16, 1976

[54] SEAMLESS KNIT LOWER BODY GARMENT AND METHOD OF MAKING SAME

[75] Inventor: Oscar Fregeolle, Hickory, N.C.

[73] Assignee: Prenihan A.G., Zurich, Switzerland

[22] Filed: July 28, 1975

[21] Appl. No.: 599,655

Related U.S. Patent Documents

Reissue of:

[64] Patent No.: 3,748,870
Issued: July 31, 1973
Appl. No.: 186,344
Filed: Oct. 4, 1971

[52] U.S. Cl. ..... 66/177
[51] Int. Cl.[2] ..... A41B 9/02
[58] Field of Search ..... 66/175–176

[56] References Cited

UNITED STATES PATENTS

| | | | |
|---|---|---|---|
| 2,511,720 | 6/1950 | Lacks | 66/177 |
| 2,560,580 | 7/1951 | Lacks | 66/176 |
| 2,962,884 | 12/1960 | Garrou et al. | 66/177 |
| 3,075,375 | 1/1963 | Garrou et al. | 66/177 |
| 3,109,300 | 11/1963 | Garrou et al. | 66/177 |
| 3,673,821 | 7/1972 | Johnson | 66/177 |

FOREIGN PATENTS OR APPLICATIONS

| | | | |
|---|---|---|---|
| 1,807,974 | 7/1970 | Germany | 66/177 |

*Primary Examiner*—Ronald Feldbaum
*Attorney, Agent, or Firm*—Robert B. Frailey

[57] ABSTRACT

The garment includes a panty portion [ formed of fashioned gussets ] and a pair of legs integrally knit with the panty portion. The legs may be short to provide a panty, panty girdle and the like or they may be long and provided with foot portions to form tights, leotards, panty hose and the like. [ Fashioned front ] *Front* and rear [ gussets ] *portions* of the panty portion are provided with knit selvage edges to form a waist opening in the garment during the knitting operation and to eliminate the need for slitting the garment in a subsequent operation to form the waist opening. Elastic yarns may be incorporated in the portion of the garment surrounding the waist opening to provide an integrally knit elastic band around the waist opening.

20 Claims, 10 Drawing Figures

SEAMLESS KNIT LOWER BODY GARMENT AND METHOD OF MAKING SAME

Matter enclosed in heavy brackets [ ] appears in the original patent but forms no part of this reissue specification; matter printed in italics indicates the additions made by reissue.

This invention relates generally to seamless knit two-legged lower body garments, such as panties, panty girdles, bathing suit trunks, tights, leotards, panty hose and the like and to the method of making the same. More particularly, the present invention relates to such garments wherein a waist opening having a selvage edge is formed during the knitting process so that it is not necessary to subsequently slit the garment to form the waist opening.

It is known to form two-legged lower body garments on a circular knitting machine by first knitting one leg of successive complete courses, knitting a panty portion by forming a first fashioned extension of partial courses, knitting joined together fashioned front and rear gussets of partial courses, knitting a second fashioned extension of partial courses, and finally knitting a second leg of successive complete courses. To form the waist opening, a walewise slit is formed to separate the front and rear gussets and the waist is completed by attaching an elastic waist band to the slit edges thereof. Two-legged lower body garments of this type are illustrated and the methods of knitting the same are described in U.S. Pat. Nos. 2,962,884; 3,109,300; and 3,109,301. While the fashioning of the body portions may be varied in accordance with these patents, the front and rear gussets are connected together at their upper ends and must be manually slit to form a waist opening. An elastic band is then attached to the opening to complete the garment. Of course, this adds to the cost of producing the garment, and the accurate positioning of the slit depends upon the skill of the particular person forming the slit.

It is also known to produce panty hose type garments by knitting an elongate seamless tube, slitting the medial portion in a walewise direction to form a waist opening and then attaching a suitable elastic band or tape to the garment. The opposed ends of the elongate tubes are closed and form opposed leg and foot portions of the garment.

With the foregoing in mind, it is an object of the present invention to provide a one-piece seamless two-legged lower body garment wherein a waist opening having selvage edges is formed during the knitting process so as to eliminate a subsequent manual slitting operation.

It is another object of the present invention to provide a seamless two-legged lower body garment wherein elastic yarn may be incorporated in selected portions of the panty portion. For example, the elastic yarn may be incorporated throughout the front and/or rear gussets. Also, the elastic yarn may be incorporated in a few wales at the upper ends of the partial courses of the front and rear gussets to form an integrally knit elastic band in the portion of the garment surrounding the waist opening.

It is a further object of the present invention to provide a method of knitting a seamless two-legged lower body garment which may be carried out on a circular hosiery knitting machine and which requires only minor modifications of the knitting machine.

In accordance with the present invention, the seamless knit lower body garment includes a panty portion and a pair of legs integrally knit with the panty portion, each of the legs being knit of successive complete courses. The panty portion comprises fashioned extensions formed of partial courses and extending upwardly from each of the legs, and fashioned front and rear gussets formed of partial courses and being knit integral with and connecting the fashioned extensions. The front and rear gussets are formed of partial courses extending vertically of the panty portion. The lower ends of the partial courses of the front and rear gussets are joined to the partial courses of the extensions and the upper ends of the partial courses of the front and rear gussets form knit selvage edges separating the front and rear gussets and providing a waist opening in the upper end of the panty portion. The legs may be short and form a panty or girdle type garment or they may be extended and have their lower ends closed to form the leg and foot portions of a panty hose, leotard or tights type of garment.

The garment of the present invention is preferably knit on a circular hosiery knitting machine of the type which is adapted to at times knit with continuous rotation of the needle cylinder and to at other times reciprocate and form fashioned partial courses.

Other objects and advantages of the invention will appear as the description proceeds, when taken in connection with the accompanying drawings, in which.

Figure 1:
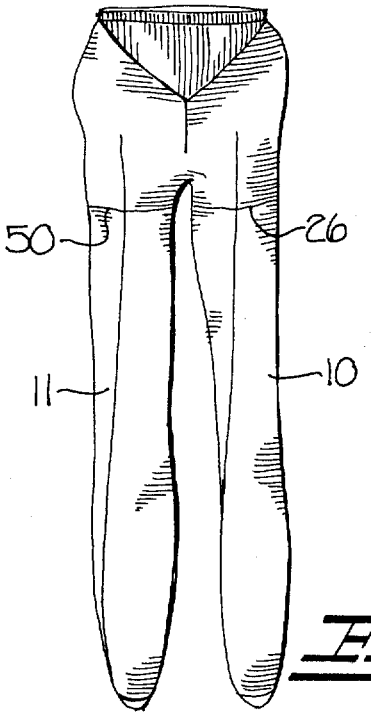
FIG. 1 is a front elevation of a panty hose type of seamless lower body garment knit in accordance with the present invention, and illustrating the lower toe portions being closed, with an integrally knit elastic waist band being formed at the upper end thereof.
Figure 2:
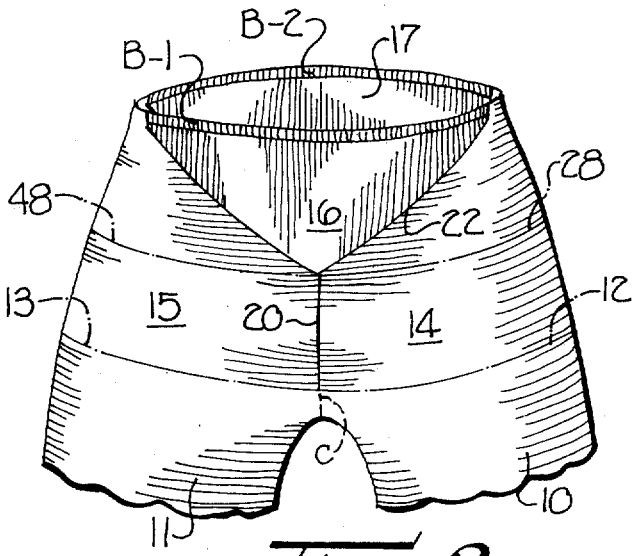
FIG. 2 is an enlarged front elevation of the upper panty portion of the garment shown in FIG. 1.
Figure 3:
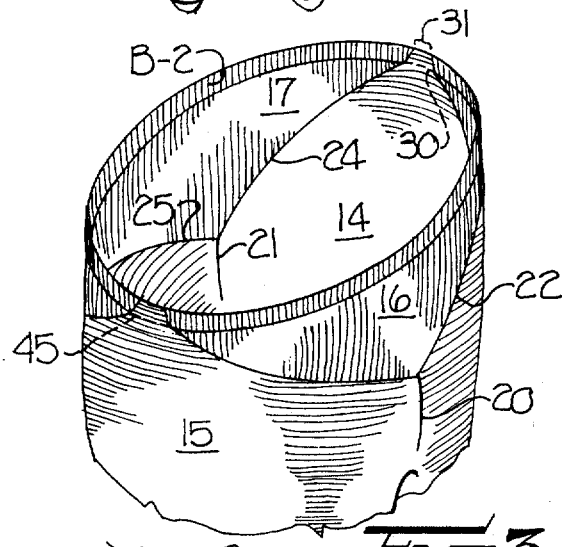
FIG. 3 is an isometric view of the upper panty portion with the waist opening extended.
Figure 4:
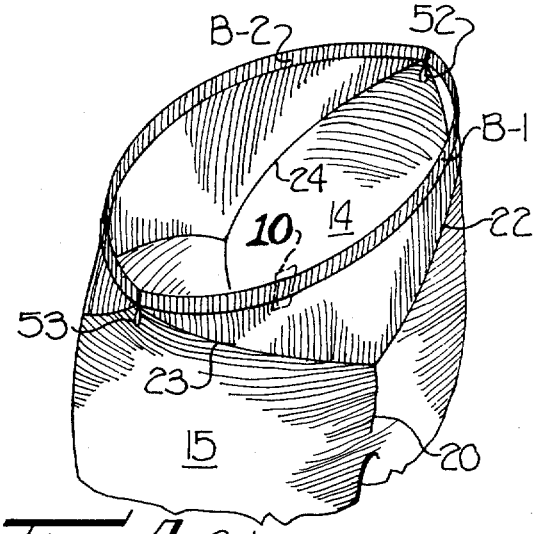
FIG. 4 is a view similar to FIG. 3 but illustrating the waist band portions of the front and rear gussets being joined and connected together by short seams at opposite sides of the garment.
Figure 5:
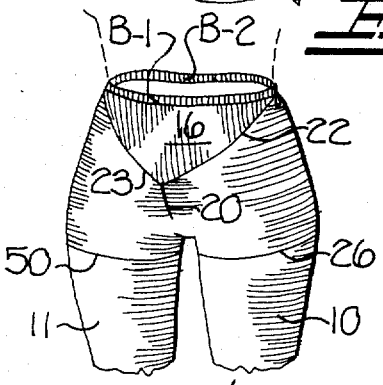
FIG. 5 is a front view of the upper portion of the garment and illustrating the same in the condition it would appear when worn.
Figure 6:
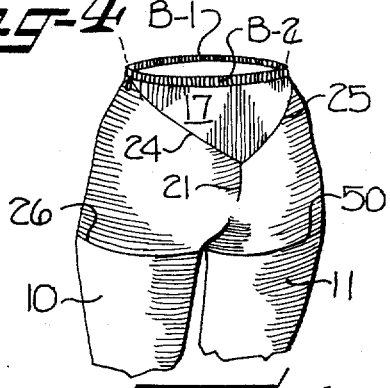
FIG. 6 is a view similar to FIG. 5 but illustrating the rear portion of the garment.

As illustrated in FIGS. 1–3, the garment blank is knit in a suitable shape for forming a panty hose type garment and includes a pair of seamless tubular legs 10, 11 which are formed of successive complete courses. The courses of the legs extend substantially horizontally or transversely of the legs 10, 11, as illustrated by the shading in the drawings. As illustrated in FIG. 2, the upper ends of the legs 10, 11, terminate along the respective dash-dot lines 12, 13 and the inner portions of the legs 10, 11 are joined together in the crotch area, as indicated by the dotted line C, in a manner to be presently described.

The panty portion of the garment includes fashioned extensions 14, 15 extending upwardly from the respective legs 10, 11 and being formed of fashioned partial courses. Fashioned front and rear gussets 16, 17 are knit integral with and connect the fashioned extensions 14, 15. The front and rear gussets 16, 17 are *disposed intermediate of the fashioned extensions 14, 15 and are* formed of partial courses extending vertically of the panty portion and their lower ends are joined to the opposed ends of the partial courses of the extensions 14, 15 while their upper ends form knit selvage edges providing a waist opening in the upper end of the panty portion.

It is to be understood that the knitting of the fashioned extensions 14, 15 and the fashioned front and rear gussets 16, 17 may be varied as desired to provide increased length, increased width or different shapes to the body portion, as fully described in U.S. Pat. Nos. 2,962,884; 3,109,300 and 3,109,301. The particular fashioning of the body portion *or panty* of the garment illustrated in the drawings will be presently described in connection with the description of the method of knitting the garment. The fashioned sections of the panty portion are joined together along suitable suture or gore lines. For example, the opposed ends of the partial courses in the lower portions of the fashioned extensions 14, 15 are joined together along respective vertically extending front and rear gore lines 20, 21. The lower ends of the partial courses of the front and rear gussets 16, 17 are joined to the opposed ends of the partial courses of the extensions 14, 15 along respective diagonally extending front gore lines 22, 23 and rear gore lines 24, 25.

*The complete body portion or panty of the one-piece panty hose garment illustrated in FIGS. 1–6 extends from line 26 to line 50. The panty includes two spaced rotary knit leg portions disposed, respectively, between lines 26 and 12 and between lines 13 and 50. The two rotary knit leg portions join at the crotch C and also are connected by the intermediate panty portion consisting of fabric sections 14, 16, 17 and 15, each of which is composed of reciprocatory knit partial courses.*

METHOD OF KNITTING

In knitting the panty hose type of garment illustrated in FIG. 1, the knitting begins at the lower toe end of the leg 10 and the needle cylinder of the circular knitting machine continuously rotates, usually in a counterclockwise direction. Suitable body yarn, usually some type of stretch yarn, is fed to all of the needles in the needle cylinder to form successive complete or full courses with each rotation of the needle cylinder. Suitable reinforcing yarn may be knit with the body yarn in the toe or heel portion and the leg 10 is usually knit of fine denier yarn to provide a sheer appearance to the leg. It is usually desirable to add a reinforcing yarn or to knit the panty portion of a heavy denier yarn, as indicated by the line 26 in FIGS. 1, 5 and 6.

Upon completion of the knitting of the complete course of the leg 10, up to the dash-dot line 12 in FIG. 2, the group of needles which form the crotch portion, along the dotted line C in FIG. 2, are moved to an inoperative or holding position. These needles are usually raised to a position to pass above the stitch cams and to hold the stitch loops thereon while the remaining needles are maintained in a lowered or active position and the needle cylinder begins to reciprocate. Partial courses are then knit on these active needles to form the fashioned extension 14 while the usual narrowing picks of the machine are utilized to gradually decrease the length of the partial courses up to the dash-dot line 28 of FIG. 2. The needles which are raised to inoperative position during the narrowing operation continue to hold the stitch loops thereon.

The circular knitting machine may be of the type illustrated in U.S. Pat. No. 3,292,392 and the group of partial courses between the dash-dot lines 12 and 28 of FIG. 2 are preferably gradually reduced at a relatively slow rate, for example by one stitch loop at the opposed ends of every other partial course. The needles raised to inactive position hold the stitch loops until they are moved back to active position, during the knitting of the fashioned extension 15, to form the vertically extending front and rear gore lines 20, 21. Reciprocation of the needle cylinder continues above the dash-dot line 28 and the length of the partial courses is gradually reduced at a greater rate with the endmost needles being idled in selected courses. For example, one needle may be raised to hold one stitch loop with the knitting of each successive partial course. The idled needles hold the stitch loops along what will form the front and rear gore lines 22, 24.

Near the upper end of the fashioned extension 14, along the dotted lines 30 (FIG. 3), the rate of decrease is reduced during the knitting of the last few partial courses which are very narrow. The last partial course of the extension 14 is knit on a very few needles, as indicated by the bracket 31 in FIG. 3. Then, this group of needles which knit the last partial course of extension 14 is moved to a lowered inactive position to pass beneath the stitch cams and to hold the stitch loops thereon. This group of inactive needles, as indicated at 31 in FIGS. 7–9, remain in a lowered position during the knitting of the front and rear gussets 16, 17 on opposed sides thereof.

During continued reciprocation of the needle cylinder, the front and rear fashioned gussets 16, 17 are then knit on groups of needles on opposite sides of the inactive group of needles 31. During the knitting of the first partial course of both the front and rear gusset panels 16, 17, groups of inactive needles, indicated at 32, 33, are simultaneously lowered to the active position on opposite sides of the inactive needles 31.

Figure 7:
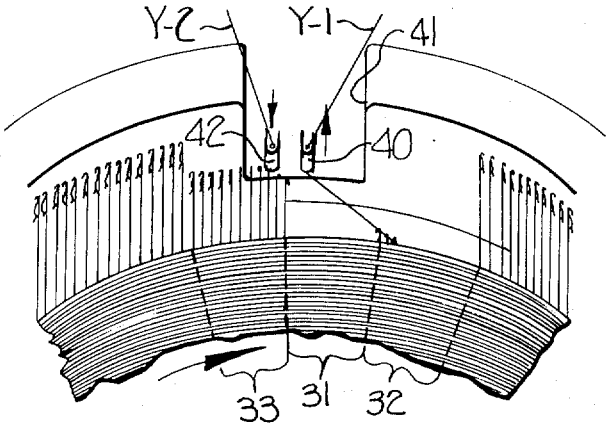
FIG. 7 is a somewhat schematic isometric view looking inwardly at one feeding station of a circular hoisery knitting machine and illustrating the manner in which the front and rear gussets are knit during one clockwise movement of the needles.
Figure 8:
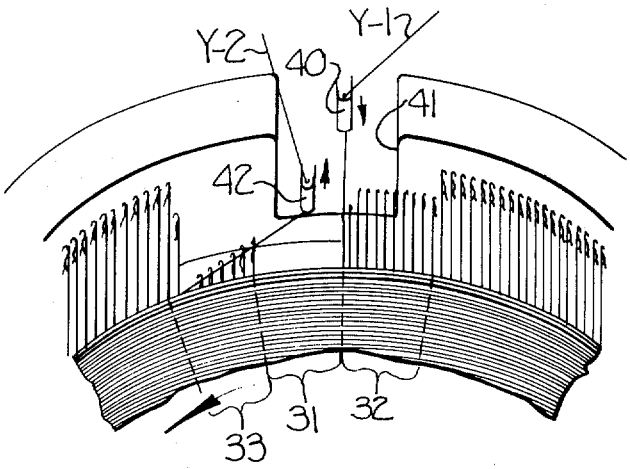
FIG. 8 is a view similar to FIG. 7 but illustrating the manner in which the gussets are knit during one counterclockwise movement of the needles.

These simultaneously activated groups of needles 32, 33 form what may be referred to as the waist band portion and the knit selvage edges forming the waist opening in the upper end of the panty portion. In the knitting of the first partial course of the front gusset 16, with the needle cylinder moving in a clockwise direction as illustrated in FIG. 7, the yarn Y-1, forming the partial courses of the front gusset 16, is fed to the active group of needles 32 to form the first partial course on all of the active needles and to join the stitch loops to the endmost stitch loops which had been held on the needles idled during the knitting of the partial courses in the upper end of the extension 14. The yarn Y-1 is fed through a yarn feed finger 40 supported for movement between active and inactive positions in the throat plate 41 of the machine. As this group of active needles 32 passes the throat plate 41 and picks up and knits the yarn Y-1, the feed finger 40 is raised to an inoperative position and a second feed finger 42 is lowered to operative position to be in the proper position to feed a second yarn Y-2 to the group of active needles 33 and to knit the first partial course of the rear gusset 17. With continued movement of the needle cylinder in the clockwise direction, as indicated in FIG. 7, the active needles in the group 33 pick up and knit the yarn Y-2 to form the first partial course in the rear gusset 17 and the endmost stitch loops from the partial courses of the upper end of the extension 14 will be joined to this partial course.

As the needle cylinder swings in a counterclockwise direction, as illustrated in FIG. 8, the yarn Y-2 is again fed to the needles of the active group 33 by the lowered feed finger 42 to knit the second partial course of the rear gusset 17. The feed finger 42 is then raised upwardly, and the feed finger 40 is lowered as the needles of the inactive group 31 move past the throat plate 41 so that the active group of needles 32 pick up and knit the yarn Y-1 to form a second partial course of the front gusset 16. Thus, the yarn Y-1 extends from the last stitch loop of the first partial course of the front gusset 16 to the first formed stitch loop of the second partial course of the front gusset 16 to form a knit selvage edge along the upper edge of the front gusset 16.

Figure 9:
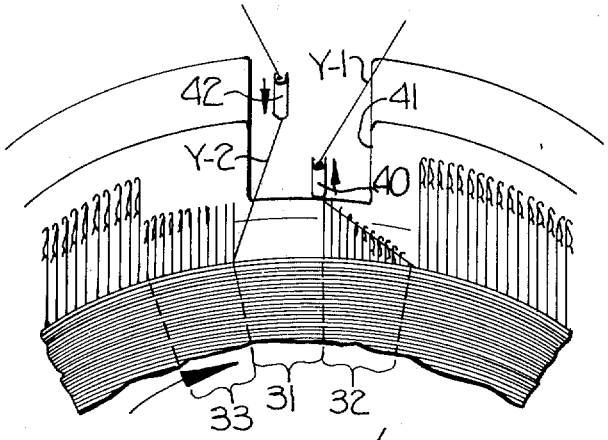
FIG. 9 is a view similar to FIGS. 7 and 8 but illustrating another position of the needles during a clockwise movement.

During the next successive movement of the needle cylinder in the clockwise direction, as illustrated in FIG. 9, the yarn Y-1 is fed from the lowered finger 40 and to the needles of the active group 32 to form the third partial course of the front gusset 16. During this same clockwise movement, the yarn Y-2 is fed from the yarn feed finger 42, which is then lowered into feeding position, to form the third partial course of the rear gusset 17 on the needles of the active group 33 as they pass the throat plate 41. Thus, the yarn Y-2 extends from the last formed stitch loop in the second partial course of the rear gusset 17 to the first formed stitch loop of the third partial course and thereby forms a knit edge along the end edge of the rear gusset 17. As reciprocation of the needle cylinder continues, the length of the partial courses formed in the respective front and rear gussets 16, 17 by the active groups of needles 32, 33 is gradually increased. The endmost stitch loops at the lower ends of the partial courses of the front and rear gussets 16, 17 are joined to the endmost stitch loops of the partial courses of the extension 14, along the respective front and rear gore lines 22, 24.

When the maximum number of needles to knit the front and rear gussets 16, 17 is reached, at the center of these gussets, the number of needles is gradually decreased and needles are raised to inactive position at the lower ends of the partial courses forming the front and rear gussets 16, 17. The number of needles knitting the successive partial courses in the second half of the front and rear gussets 16, 17 is gradually reduced until the number is again reduced to the needles of the active groups 32, 33. All of these active needles are then deactivated or raised to an inactive position to hold the stitch loops thereon. The inactive needles of group 31 are simultaneously activated and the yarn Y-1 is fed thereto to form the first partial course of the extension 15. Since these inactive needles 31 have been holding the stitch loops of the last partial course of the extension 14, these partial courses will be joined together.

As reciprocation of the needle cylinder continues, the number of needles knitting the partial courses in the first few partial courses of the extension 15 gradually increases, down to the dotted line 45 (FIG. 3). With continued reciprocation of the needle cylinder, the ends of partial courses of the extension 15 are joined to the endmost stitch loops of the partial courses at the lower ends of the front and rear gussets 16, 17 to form the respective front and rear gore lines 23, 25. The same rate of increase or widening of the partial courses in the upper portion of the extension 15 is continued down to the dash-dot line 48 (FIG. 2) and then the rate of increase is reduced so that the endmost stitch loops of the partial courses of the extension 15, between the dash-dot lines 48, 13, are joined to the endmost stitch loops of the partial couses of the extension 14 to thereby form the front and rear vertical gore lines 20, 21. Upon completion of the knitting of these partial courses, down to the dash-dot line 13 (FIG. 2), the needle cylinder again switches to rotary movement and complete courses are knit on all of the needles to form the upper portion of the leg 11, including the needles which had been holding stitch loops in the crotch area along the dotted line C in FIG. 2. The desired number of complete courses are then knit to complete the desired length of the length 11 and a suitable yarn change may be made, along the line indicated at 50 in FIGS. 1, 5 and 6, to form a sheer leg portion.

Figure 10:
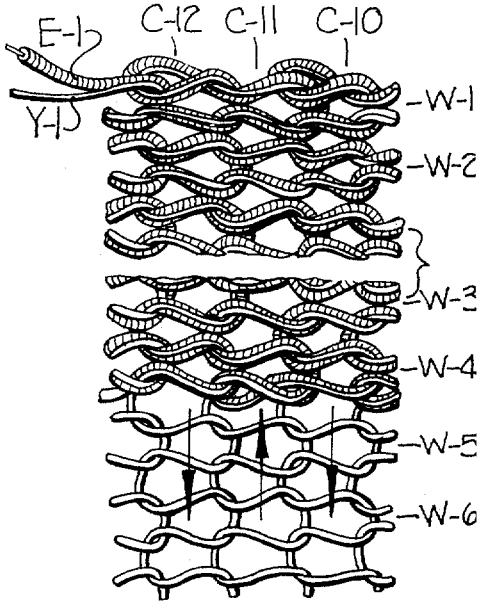
FIG. 10 is a greatly enlarged fragmentary view of a few wales at the upper ends of the partial courses forming the front gusset of the garment, being taken substantially within the dash-dot rectangle 10 in FIG. 4.

The manner in which the upper knit selvage edge of the front gusset 16 is formed is best illustrated in FIG. 10 wherein the partial courses C-10 through C-12 are knit in the directions indicated by the arrows and the yarn Y-1 forms the first stitch loop in wale W-1 of the partial couse C-10, then forms the last stitch loop in wale W-1 of the partial course C-11 and extends to form the first stitch loop of the partial course C-12. It is to be understood that the partial courses of the rear gusset 17 also include a knit selvage edge similar to that illustrated in FIG. 10.

It is also possible to knit an integral elastic band in the few wales of the upper portions of the partial courses in the front and rear gussets 16, 17. This is accomplished by providing two additional yarn feed fingers in the throat plate 41 (FIGS. 7–9) to feed a suitable elastic yarn, such as indicated at E-1 in FIG. 10, to a predetermined number of the needles forming the uppermost ends of the partial courses of the front and rear gussets 16, 17. As indicated in FIG. 10, this elastic yarn E-1 is knit in plated relationship with the body yarn Y-1 in a few of the wales extending downwardly from the upper selvage edge. The movement of the corresponding elastic feed fingers is the same as the body yarn feed fingers except that they only feed yarns to a few needles forming the uppermost wales of the partial courses of the front and rear gussets 16, 17. The elastic yarns form front and rear integrally knit elastic bands indicated at B-1 and B-2 in FIGS. 1–6.

As shown in FIG. 3, the opposed ends of the elastic bands B–1, B–2 being connected together, it is preferred spaced apart by the few partial courses in the upper portions of the extensions 14, 15. While it is possible to use the garment without the ends of the two elastic bands B', B-2 being connected together, it is preferred that these two bands be joined together by short lines of stitching on both sides, as indicated at 52, 53 in FIG. 4. These lines of stitching 52, 53 may be formed by drawing the two endmost portions of the bands B-1 and B-2 together, the surplus material therebetween being folded inwardly, and then stitching an overedge seam along these folded lines.

When the panty portion of the garment is knit in the manner heretofore described, the last partial course of the extension 14 is connected to the first partial course of the extension 15 and must be separated therefrom, as by cutting, before the ends of the elastic bands B-1, B-2 are joined together by the lines of stitching 52, 53. However, it is to be understood that the panty portion may be knit without joining the partial courses of the extensions 14 and 15. For example, the needles knitting the last partial course of the extension may be raised and lowered to shed this last course and these needles may remain inactive during the knitting of the *intermediate* front and rear gussets. Then alternate ones of these needles may be raised to pick up yarn and form a makeup to start knitting on all of the needles in forming the first partial course of the extension 15. Also, a few partial courses of the same length may be knit to form a tab joining the upper ends of the extensions 14, 15.

Although the elastic yarn E-1 (FIG. 10) is illustrated as being knit in plated relationship with the body yarn Y-1 in a few wales to form the elastic band B-1, it is to be understood that the elastic yarn could be knit with the body yarn to the lower ends of the partial courses of the front gusset 16 to provide an elastic panel or gusset in the front of the garment. Also, the elastic yarn may be knit with the body yarn in the rear gusset 17 and/or in the fashioned extensions 14, 15.

In order to form a panty, panty girdle or the like, the legs 10, 11 can be made very short and a suitable hem provided at both lower terminal ends. Also, it is to be understood that any suitable type of yarn may be used and any stitch construction may be provided in both the leg and panty portions of the garment.

In the drawings and specification, there have been set forth preferred embodiments of the invention, and although specific terms are employed, they are used in a generic and descriptive sense only and not for purposes of limitation.

That which is claimed is:

1. A seamless knit lower body garment including a panty portion and a pair of legs integrally knit with said panty portion, each of said legs comprising successive complete courses, said panty portion comprising fashioned extensions formed of partial courses and extending upwardly from each of said legs, and fashioned front and rear gussets formed of partial courses and being knit integral with and connecting said fashioned extensions, said partial courses of said front and rear gussets extending vertically of said panty portion with their lower ends being joined to the ends of said partial courses of said extensions, and the upper ends of said partial courses of said front and rear gussets including knit selvage edges providing a waist opening in the upper end of said panty portion and between said front and rear gussets.

2. A seamless knit lower body garment according to claim 1 wherein said panty portion is knit of a stretchable body yarn, and including an elastic yarn knit in plated relationship with said body yarn in a few wales adjacent the upper ends of said partial courses of said front and rear gussets to provide an integrally formed elastic waist band around the waist opening in the upper end of said panty portion.

3. A seamless knit lower body garment according to claim 1 wherein said panty portion is knit of a body yarn, and including an elastic yarn knit in plated relationship with said body yarn throughout said front gusset to provide an elastic panel in the front of said panty portion.

4. A seamless knit lower body garment according to claim 1 wherein said legs are of substantial length and include a closed lower foot portion to form a panty hose type garment.

5. A method of knitting a seamless lower body garment including a panty portion and a pair of legs integrally knit with said panty portion, said panty portion comprising first and second fashioned extensions extending upwardly from each of said legs, and fashioned front and rear gussets connecting said fashioned extensions, said method comprising the steps of knitting the first of said legs by forming successive complete courses, knitting said first fashioned extension by forming partial courses and gradually decreasing the length thereof, knitting said fashioned front and rear gussets by forming partial courses while first gradually increasing the length of the partial courses and then decreasing the length of the partial courses at one end thereof and while forming a knit selvage edge at the other ends of said partial courses to provide a waist opening in the upper end of said panty portion and between said front and rear gussets, knitting said second fashioned extension by forming partial courses and gradually increasing the length of said partial courses, and then knitting the second of said legs by forming successive complete courses.

6. A method according to claim 5 including the step of knitting an elastic yarn in a few wales adjacent the knit selvage edges of said front and rear gussets to provide an integrally formed elastic waist band around the waist opening in the upper end of said panty portion.

7. A method according to claim 5 including the step of knitting an elastic yarn in all the wales of said front gusset to provide an elastic panel in the front portion of said panty portion.

8. A method of knitting a seamless lower body garment on a circular knitting machine including a needle cylinder and means for selectively rotating and reciprocating said needle cylinder, said garment including a panty portion and a pair of legs integrally knit with said panty portion comprising a fashioned extension extending upwardly from each of said legs, and fashioned front and rear gussets knit integral with and connecting said fashioned extensions, said method comprising the steps of continuously rotating said needle cylinder and knitting successive complete courses to form one of said legs, reciprocating said needle cylinder and knitting partial courses gradually decreasing in length to form the first of said fashioned extensions, continuing to reciprocate said needle cylinder and knitting separated groups of partial courses of separate yarns to form said front and rear gussets and while first gradually increasing the length of the partial courses and then decreasing the length of the partial courses at one end thereof and while forming a knit selvage edge at the other ends of said partial courses to provide a waist opening in the upper end of said panty portion and between said front and rear gussets, continuing to reciprocate said needle cylinder and knitting partial courses gradually increasing in length to form the second of said fashioned extensions, and then rotating said needle cylinder and knitting successive complete courses to form the other of said legs.

9. A method according to claim 8 including the step of knitting separate elastic yarns in a few wales adjacent the knit selvage edges of said front and rear gussets to provide an integrally formed elastic waist band around the waist opening in the upper end of said panty portion.

10. A method according to claim 8 including the step of holding the last partial course of said first fashioned extension while knitting said front and rear gussets, joining the first partial course of said second fashioned extension to the last partial course of said first fashioned extension, and then completing the garment by severing the connection between the last partial course of said first extension and the first partial course of said second extension, bringing together opposed ends of the last partial course of said first extension and the first partial course of said scond extension, and forming seams at opposite sides of said panty portion and extending downwardly in said extensions and connecting together the partial courses of said front and rear gussets at opposite sides of said panty portion.

*11. A seamless knit one-piece lower body garment including a panty portion and a pair of legs integrally knit with said panty portion, each of said legs comprising successive complete courses, said panty portion including a knit-in waist opening, wherein*

*a. said panty portion includes an intermediate portion formed of reciprocatory knit partial courses,*

*b. the waist opening has spaced knit selvage edges, and*

*c. said knit selvage edges comprise the terminal ends of reciprocatory knit partial courses.*

*12. A garment according to claim 11, wherein said panty portion is knit of a stretchable body yarn, and including an elastic yarn knit with said body yarn in a few wales adjacent said knit selvage edges to provide an integrally formed elastic waistband adjacent said waist opening.*

*13. A garment according to claim 11, wherein said panty portion is knit of a body yarn and includes a waistband knit integrally with said panty portion, said waistband including an elastic yarn knit with said body yarn in selected wales adjacent said knit selvage edges of said waist opening.*

*14. A garment according to claim 11, wherein*

*a. said waist opening is at least two wales wide and*

*d. said legs are of substantial length and include a closed lower foot portion to form a panty hose type garment.*

*15. A garment according to claim 11, wherein*

*a. said selvage edges extend walewise and define a waist opening at least two wales wide,*

*b. said panty portion is knit of a stretchable body yarn, and*

*c. a waistband is knit integrally with said panty portion,*

*d. said waistband including an elastic yarn knit with said body yarn in selected wales adjacent said knit selvage edges.*

*16. A method of knitting a seamless one-piece lower body garment including a panty portion and a pair of legs integrally knit with said panty portion, said panty portion including a knit-in waist opening, said method comprising the steps of:*

*a. knitting the first of said legs by forming successive complete courses,*

*b. knitting the panty portion,*

*c. during knitting of the panty portion, knitting an intermediate portion of said panty portion by reciprocatory knitting to form partial courses terminating in spaced knit selvage edges defining said waist opening, and*

*d. then knitting the second of said legs by forming successive complete courses.*

*17. A method according to claim 16, further including the step of knitting an elastic yarn in a few wales adjacent said knit selvage edges of said waist opening to provide an integrally formed elastic waistband.*

*18. A method of knitting a seamless one-piece lower body garment on a circular knitting machine including a needle cylinder and means for selectively rotating and reciprocating said needle cylinder, said garment including a panty portion and a pair of legs integrally knit with said panty portion, said panty portion including a knit-in waist opening having selvage edges, said method comprising the steps of:*

*a. rotating said needle cylinder and knitting successive complete courses to form one of said legs,*

*b. reciprocating said needle cylinder and knitting successive courses to form said panty portion;*

*c. during reciprocation of said needle cylinder knitting an intermediate portion of partial courses terminating in spaced knit selvage edges to provide said waist opening, and*

*d. then rotating said needle cylinder and knitting successive complete courses to form the other of said legs.*

*19. A method according to claim 18 further including the step of knitting an elastic yarn in said knit selvage edges and adjacent said waist opening to provide an integrally formed elastic waistband.*

*20. A method of knitting on a circular knitting machine a seamless one-piece lower body garment including a panty portion and a pair of legs integrally knit with said panty portion, said panty portion including a knit-in waist opening, said method comprising the steps of:*

*a. knitting a first portion of the garment by unidirectional rotary knitting to provide a first leg of the garment,*

*b. knitting a medial portion of the garment by reciprocatory knitting to provide said panty portion of the garment,*

*c. during reciprocatory knitting of the panty portion, forming an intermediate portion of fabric courses which terminate in spaced knit selvage edges, to provide a waist opening having two opposing, walewise extending, knit selvage edges,*

*d. knitting an elastic yarn in a selected number of wales adjacent said knit selvage edges to provide an integrally formed elastic waistband, and*

*e. then knitting the remaining portion of the garment by unidirectional rotary knitting to provide the second of said legs of the garment.*

* * * * *